(12) United States Patent
Hashimoto et al.

(10) Patent No.: US 9,399,437 B2
(45) Date of Patent: Jul. 26, 2016

(54) BUMPER REINFORCEMENT AND METHOD FOR MANUFACTURING THE SAME

(71) Applicant: Kabushiki Kaisha Kobe Seiko Sho (Kobe Steel, Ltd.), Kobe-shi (JP)

(72) Inventors: Narikazu Hashimoto, Shimonoseki (JP); Tsunetake Tsuyoshi, Shimonoseki (JP); Shingo Shimoaka, Shimonoseki (JP); Hiroyuki Kajiwara, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 13 days.

(21) Appl. No.: 14/453,141

(22) Filed: Aug. 6, 2014

(65) Prior Publication Data

US 2015/0069772 A1 Mar. 12, 2015

(30) Foreign Application Priority Data

Sep. 9, 2013 (JP) .................................. 2013-186731

(51) Int. Cl.
| | | |
|---|---|---|
| B60R 19/00 | (2006.01) | |
| B60R 19/18 | (2006.01) | |
| B21D 53/88 | (2006.01) | |

(52) U.S. Cl.
CPC ................ *B60R 19/18* (2013.01); *B21D 53/88* (2013.01); *B60R 2019/182* (2013.01)

(58) Field of Classification Search
CPC .......... B60R 19/18; C22F 1/053; C22C 21/10
USPC ......................................... 293/102, 120, 122
See application file for complete search history.

(56) References Cited

U.S. PATENT DOCUMENTS

| | | | | |
|---|---|---|---|---|
| 5,407,239 A | * | 4/1995 | Arai ........................ | B60R 19/18 293/102 |
| 2001/0024051 A1 | * | 9/2001 | Kariatsumari .......... | B60R 19/18 296/155 |
| 2008/0054656 A1 | | 3/2008 | Guiles et al. | |
| 2010/0021842 A1 | | 1/2010 | Kanga | |
| 2011/0049915 A1 | * | 3/2011 | Kokubo ................. | B21D 53/88 293/132 |
| 2012/0043701 A1 | | 2/2012 | Kanga | |
| 2013/0285291 A1 | | 10/2013 | Kanga | |
| 2014/0152029 A1 | * | 6/2014 | Taniguchi ............... | B60R 19/18 293/102 |

FOREIGN PATENT DOCUMENTS

| | | |
|---|---|---|
| JP | 7-25296 | 1/1995 |
| JP | 7-305151 | 11/1995 |
| JP | 10-168553 | 6/1998 |
| JP | 2003-118367 | 4/2003 |
| JP | 3465862 | 11/2003 |

(Continued)

*Primary Examiner* — Joseph D Pape

(74) *Attorney, Agent, or Firm* — Oblon, McClelland, Maier & Neustadt, L.L.P.

(57) ABSTRACT

A bumper reinforcement is formed of a 7000 series aluminum alloy hollow extrusion and has crushed end portions. A portion of the end portions is heated to a temperature of 400° C. or more for reversion treatment, the heated portion is subjected to cold crushing, and then the whole bumper reinforcement is subjected to age hardening. Because of the age hardening, the heated portion has higher Vickers hardness than non-heated portions by Hv 10 or more. This compensates for a decrease in reaction force in a collision of an end portion resulting from a decrease in the section modulus of the crushed portion and thereby suppresses a decrease in energy absorption.

8 Claims, 2 Drawing Sheets

(56) References Cited

FOREIGN PATENT DOCUMENTS

| JP | 2007-119853 | 5/2007 |
|---|---|---|
| JP | 4111651 | 7/2008 |
| JP | 2009-137452 A | 6/2009 |
| JP | 2010-502496 | 1/2010 |
| JP | 2010-83381 A | 4/2010 |
| JP | 2011-131647 A | 7/2011 |
| JP | 2013-23753 A | 2/2013 |

* cited by examiner

BUMPER REINFORCEMENT AND METHOD FOR MANUFACTURING THE SAME

BACKGROUND OF THE INVENTION

1. Field of the Invention

The present invention relates to a bumper reinforcement formed of a heat-treatable aluminum alloy extrusion and a method for manufacturing the bumper reinforcement.

2. Description of the Related Art

Japanese Patent Nos. 3465862 and 4111651 and Japanese Unexamined Patent Application Publication Nos. 7-25296 and 2003-118367 disclose the manufacture of automotive reinforcements, such as door beams and bumper reinforcements, that includes crushing an end region of an aluminum alloy extrusion, which is composed of a pair of opposing flanges and a plurality of webs coupled to the flanges, in a direction perpendicular to a surface of the flanges. Japanese Patent No. 4111651 discloses crushing of a press-quenched 6000 series (Al—Mg—Si) aluminum alloy extrusion after age hardening. Japanese Unexamined Patent Application Publication No. 2003-118367 discloses crushing of a press-quenched 6000 or 7000 series (Al—Zn—Mg) aluminum alloy extrusion during T1 tempering after extrusion, and age hardening of the extrusion after the crushing.

Even 7000 series aluminum alloy extrusions after press quenching and before age hardening (T1-tempered members) are hardened through natural aging and suffer a decrease in formability. As described in Japanese Unexamined Patent Application Publication Nos. 7-305151, 10-168553, and 2007-119853, in order to improve formability, 7000 series aluminum alloys hardened through natural aging are subjected to reversion treatment to decrease the strength thereof.

In a bumper reinforcement formed of an aluminum alloy hollow extrusion, crushing of an end portion of the bumper reinforcement as described in Japanese Unexamined Patent Application Publication No. 7-25296 reduces the section modulus of the crushed portion in a horizontal plane. This reduces the reaction force of the bumper reinforcement in a collision of the end portion and thereby reduces the energy absorption of the bumper reinforcement. In the case where the aluminum alloy is a 6000 or 7000 series heat-treatable aluminum alloy, a reversion treatment on the end portion of the bumper reinforcement before the crushing and age hardening after the crushing can prevent cracking caused by crushing and improve the strength of the whole bumper reinforcement. However, this does not essentially solve the problems described above.

SUMMARY OF THE INVENTION

Accordingly, it is an object of the present invention to provide a bumper reinforcement formed of an aluminum alloy hollow extrusion that can solve the problems caused by crushing of an end portion of the bumper reinforcement.

The present invention provides a bumper reinforcement formed of a heat-treatable aluminum alloy hollow extrusion. One or both end portions of the bumper reinforcement in an automobile width direction are subjected to crushing. The whole bumper reinforcement is subjected to age hardening after the crushing. The end portion including a portion to be crushed or the end portions including portions to be crushed are subjected to a reversion treatment before the crushing. A portion of the end portion or portions of the end portions subjected to the reversion treatment have higher hardness than a central portion in the automobile width direction not subjected to the reversion treatment.

In a typical example, substantially vertical front and rear flanges and a plurality of substantially horizontal webs coupled to the flanges are disposed on cross sections of the aluminum alloy hollow extrusion. The aluminum alloy hollow extrusion is crushed substantially perpendicularly to the flange surfaces, thereby bending the webs in the crushed portions and decreasing the distance between the front and rear flanges.

In the case where the heat-treatable aluminum alloy hollow extrusion is a JIS 7000 series T1-tempered member, when the heating temperature for reversion treatment is 400° C. or more, the difference in Vickers hardness between a portion of an end portion subjected to the reversion treatment and a central portion in the automobile width direction not subjected to the reversion treatment can easily be Hv 10 or more. The term "T1-tempered member", as used herein, refers to a member that is not subjected to artificial age hardening but is subjected to natural aging after press quenching.

In a bumper reinforcement according to the present invention, a portion (crushed portion) of an end portion subjected to reversion treatment has higher hardness and strength after aging than portions not subjected to reversion treatment (portions only subjected to age hardening, such as a central portion in the automobile width direction). This compensates for a decrease in reaction force in a collision of the end portion resulting from a decrease in section modulus and thereby compensates for a decrease in energy absorption of the bumper reinforcement.

In the present invention, the reversion treatment temperature can be appropriately controlled to prevent cracking caused by crushing, improve the hardness and strength of a crushed portion after aging, and improve the reaction force in a collision of an end portion and energy absorption.

DESCRIPTION OF THE PREFERRED EMBODIMENTS

A bumper reinforcement according to the present invention and a method for manufacturing the bumper reinforcement will be more specifically described with reference to FIGS. 1 to 5.

Figure 1:
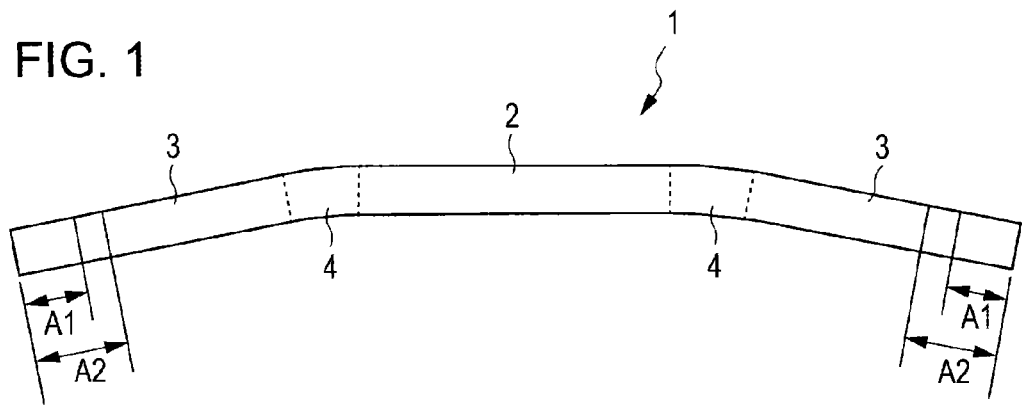
FIG. 1 is a plan view of a portion to be crushed and a portion to be heated for reversion treatment in an end portion of a bumper reinforcement.

A bumper reinforcement 1 (a semifinished product before crushing) illustrated in FIG. 1 is formed by bending a heat-treatable aluminum alloy hollow extrusion having a rectangular cross section and is composed of a central portion 2, which is to be attached parallel to an automobile in the automobile width direction, left and right end portions 3 that are tilted toward the automobile body, and bent portions 4 coupled to the central portion 2 and the end portions 3. The boundaries between the central portion 2 and the bent portions 4 and the boundaries between the end portions 3 and the bent portions 4 are indicated by broken lines. Each of the end portions 3 is to be provided with a bumper stay. The bumper reinforcement 1 is a T1-tempered member. In general, the whole bumper reinforcement 1 is slightly hardened through natural aging. The bending may be performed between reversion treatment and crushing described below.

Figure 2:
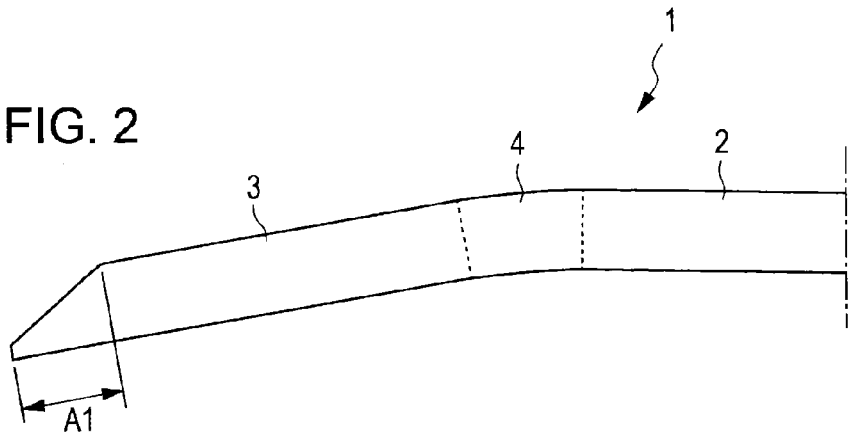
FIG. 2 is a plan view of a bumper reinforcement having a crushed portion.

After regions (portions A2 to be heated) including portions A1 to be crushed in both end portions of the bumper reinforcement 1 are heated to locally perform the reversion treatment, the portions A1 are crushed. FIG. 2 illustrates the bumper reinforcement 1 after the crushing.

The aluminum alloy hollow extrusion has a rectangular cross section and includes substantially vertical front and rear flanges (the front flange on the collision side and the rear flange on the automobile body side) and a plurality of substantially horizontal webs coupled to the flanges. The webs are bent in the crushed portions A1, and thereby the distance between the front and rear flanges is decreased.

In the case of reversion treatment of a 7000 series aluminum alloy in the present invention, the heated portions A2 were held at a temperature in the range of 400° C. to 550° C. for a predetermined time and were then cooled (air cooling or water cooling). This holding temperature is much higher than the holding temperature of common reversion treatment (see Japanese Unexamined Patent Application Publication Nos. 7-305151, 10-168553, and 2007-119853). When the heating temperature for reversion treatment is 400° C. or more, the heated portions A2 are in a redissolved state or in a state close to the redissolved state and become soft. When the heating temperature of reversion treatment exceeds 550° C., the heated portions A2 may be locally melted. The holding time may be more than zero seconds. The heated portions A2 may be cooled immediately after reaching the holding temperature. Although the upper limit of the holding time is not particularly limited, the holding time is preferably as short as five minutes or less in terms of production efficiency. Reversion treatment on other alloys (for example, 6000 series) may be performed under the same conditions. A high-frequency induction heater or a salt bath may be used as a heating means.

Crushing after reversion treatment is preferably performed within 72 hours after the reversion treatment (after cooling).

7000 series aluminum alloys generally contain Zn: 3.0 to 8.0 mass %, Mg: 0.4 to 2.5 mass %, Cu: 0.05 to 2.0 mass %, Ti: 0.005 to 0.2 mass %, and one or two or more of Mn: 0.01 to 0.3 mass %, Cr: 0.01 to 0.3 mass %, and Zr: 0.01 to 0.3 mass %, the remainder being Al and incidental impurities.

These compositions will be described below. The compositions of 7000 series aluminum alloys are known.

Zn and Mg are elements that can form an intermetallic compound $MgZn_2$ and thereby improve the strength of 7000 series aluminum alloys. A Zn content of less than 3.0 mass % or a Mg content of less than 0.4 mass % results in a practically insufficient proof stress of less than 200 MPa. Even when the extrusion is subjected to reversion treatment before crushing, a Zn content of more than 8.0 mass % or a Mg content of more than 2.5 mass % results in cracking caused by crushing, high residual tensile stress due to crushing, and significantly low stress corrosion cracking resistance. Thus, the Zn content ranges from 3.0 to 8.0 mass %, and the Mg content ranges from 0.4 to 2.5 mass %. The Zn content and the Mg content are preferably as high as possible in terms of reinforcement and weight reduction, for example, 5.0 to 8.0 mass % and 1.0 to 2.5 mass %, respectively, and 6.0 to 10.5 mass % in total.

Cu is an element that can improve the strength of 7000 series aluminum alloys. A Cu content of less than 0.05 mass % results in an insufficient strength improving effect. A Cu content of more than 2.0 mass % results in low extrusion processability. Thus, the Cu content ranges from 0.05 to 2.0 mass %, preferably 0.5 to 1.5 mass %.

Ti can reduce the size of crystal grains in the casting of 7000 series aluminum alloys and thereby improve the formability (crushing processability) of the extrusion. This requires a Ti content of 0.005 mass % or more. At a Ti content of more than 0.2 mass %, this effect is saturated, and a coarse intermetallic compound is crystallized and impairs formability. Thus, the Ti content ranges from 0.005 to 0.2 mass %.

Mn, Cr, and Zr can suppress recrystallization of 7000 series aluminum alloy extrusions, form a fine recrystallized or fibrous crystal structure, and improve stress corrosion cracking resistance. This requires one or two or more of Mn: 0.01 to 0.3 mass %, Cr: 0.01 to 0.3 mass %, and Zr: 0.01 to 0.3 mass %.

7000 series aluminum alloys contain Fe and Si as main incidental impurities. In order to maintain the characteristics of 7000 series aluminum alloys, the Fe content is limited to 0.35 mass % or less, and the Si content is limited to 0.3 mass % or less.

As illustrated in FIG. 2, the portions A1 to be crushed are subjected to crushing, and the whole bumper reinforcement 1 is subjected to age hardening. The conditions for age hardening may be known conditions set for heat-treatable aluminum alloys. It goes without saying that substantially the same age hardening conditions are applied to the bumper reinforcement 1 throughout its length in the longitudinal direction.

The age hardening hardens and strengthens the bumper reinforcement 1. Heating for reversion treatment of the portions A2 including the portions A1 to be crushed changes (reverses) the structure of the heated portions A2 from the naturally aged state to a redissolved state or a state close to the redissolved state. Thus, the heated portions A2 have higher hardness than the other portions (portions not heated for reversion treatment) that are subjected to natural aging and age hardening, for example, the central portion 2. This hardness improving effect is not produced when the heating temperature of reversion treatment is less than 400° C. The hardness of the heated portions A2 increases with the heating temperature of reversion treatment. In particular, when the heating temperature of reversion treatment is 450° C. or more, the hardness of the heated portions A2 is significantly improved probably because of sufficient redissolution. The hardness of the heated portions A2 increases with the cooling rate after the reversion treatment (the hardness is higher in the case of water cooling than air cooling).

In the case where the bumper reinforcement is formed of a 7000 series aluminum alloy hollow extrusion, the heated portions A2 including the portions A1 to be crushed have higher Vickers hardness than portions not heated for reversion treatment by Hv 10 or more. When the heating temperature of reversion treatment is 450° C. or more, the heated portions A2 of a 7000 series aluminum alloy having the composition described above can have higher Vickers hardness than portions not heated for reversion treatment by Hv 20 or more.

In the crushed portions A1, the section modulus decreases, the webs are bent, and work hardening due to crushing is substantially removed by heating for age hardening. Although these are responsible for low reaction force against collision load, the crushed portions A1 have high hardness and are reinforced because of age hardening as compared with portions not heated for reversion treatment. The reinforcement compensates for low reaction force in a collision due to a low section modulus and a decrease in energy absorption of the bumper reinforcement.

EXAMPLES

A 7000 series aluminum alloy composed of Zn: 6.39 mass %, Mg: 1.34 mass %, Cu: 0.15 mass %, Fe: 0.11 mass %, Si:

0.04 mass %, Mn: 0.02 mass %, Cr: 0.03 mass %, Zr: 0.13 mass %, and Ti: 0.02 mass %, the remainder being aluminum and incidental impurities, was subjected to hot extrusion and was fan-cooled on a production line immediately after the extrusion (press quenching), thereby forming a hollow extrusion (temper T1) having a 60 mm×120 mm rectangular cross section. The hollow extrusion was cut into hollow extrusions each having a length of 1300 mm for 13 bumper reinforcements.

Figure 3:
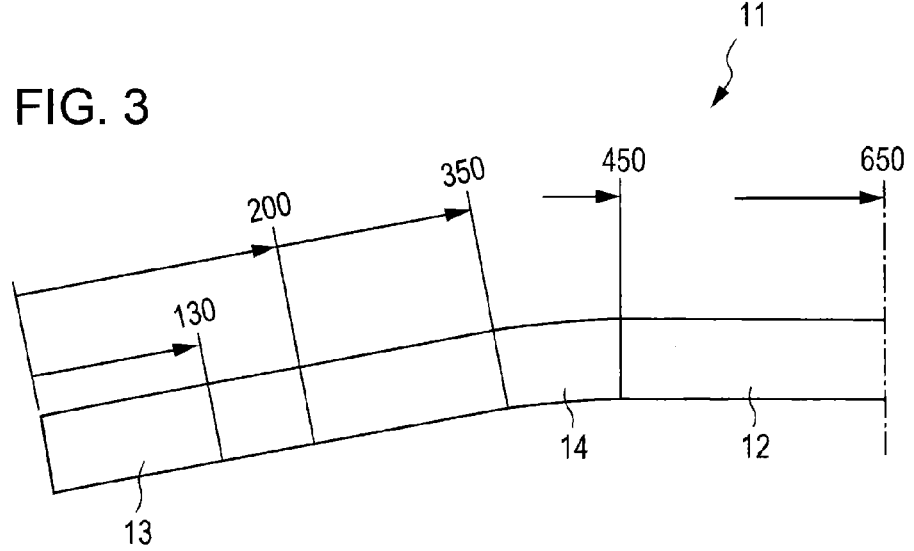
FIG. 3 is a plan view of a bumper reinforcement according to an example in which the size of each portion is shown.

Each of the hollow extrusions for bumper reinforcements was subjected to natural aging at room temperature for 20 days (T1-tempered members) and was bent to form a bumper reinforcement 11, as illustrated in FIG. 3. Thirteen bumper reinforcements were formed. The bumper reinforcement 11 was bilaterally symmetric and included a central portion 12, an end portion 13, and a bent portion 14. With reference to left and right ends (zero points), the end portion 13 extended from 0 to 350 mm, the bent portion 14 extended from 350 to 450 mm, and the central portion 12 extended from 450 to 650 mm. The bumper reinforcement 11 had a thickness of 60 mm in the direction of travel. The end portion 13 had an inclination angle of 10 degrees relative to the central portion 12. The bent portion 14 had a bend radius of 500 mm. A joint section S for a bumper stay (see FIG. 4A) in the end portion 13 of the bumper reinforcement 11 extended from 130 to 200 mm from one end. The bumper stay in the joint section S is joined to a rear flange of the bumper reinforcement 11, for example, with bolts.

The bumper reinforcement 11 was subjected to reversion treatment (except for No. 13). Heating for the reversion treatment was high-frequency induction heating. The bumper reinforcement 11 was held at the heating temperature (the heating temperature of the members) listed in Table 1 for 60 seconds and was immediately water-cooled (cooling rate: 170° C./s) or air-cooled (cooling rate: 5° C./s). Portions A2 to be heated in the reversion treatment were bilaterally symmetric and extended from 0 to 115 mm with reference to left and right ends (zero points). One of the portions A2 to be heated was indicated by dots in FIG. 4A.

Figure 4A:
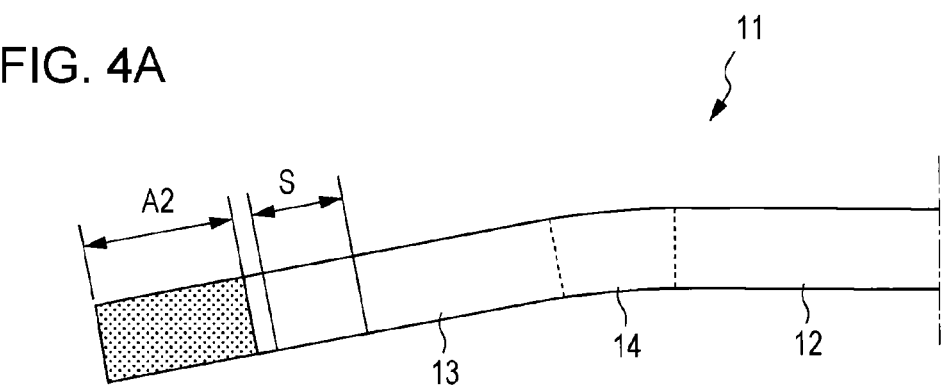
FIG. 4A is a plan view of a portion heated for reversion treatment in the bumper reinforcement illustrated in FIG. 3.
Figure 4B:
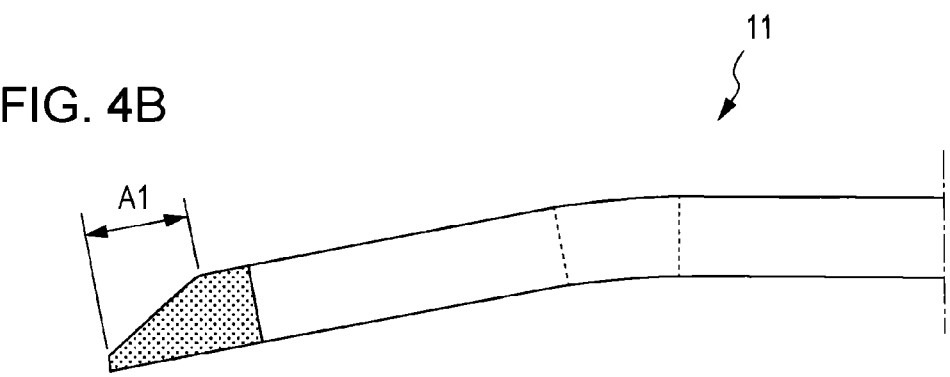
FIG. 4B is a plan view of the heated portion after crushing.

After the reversion treatment (except for No. 13), 0 to 80 mm of each end portion of the bumper reinforcement 11 was crushed in the direction of travel and was visually inspected with respect to crushing processability (the presence or absence of cracking). FIG. 4B illustrates the bumper reinforcement 11 after the crushing. In the crushed portions A1, as described above with reference to FIG. 2, upper and lower webs were bent, and the distance between the front and rear flanges was decreased.

TABLE 1

| | Portion heated for reversion treatment | | | | Hardness of non-heated portion H0 Hv | Evaluation | | | |
|---|---|---|---|---|---|---|---|---|---|
| No. | Heating temperature ° C. | Cooling rate ° C./sec | Hardness H1 Hv | Increase in hardness H1 − H0 Hv | | Maximum load kN | Energy absorption kJ | Crushing processability | Overall |
| 1 | 298 | 170 | 144 | 0 | 144 | 86 | 1.7 | x | x |
| 2 | 362 | 170 | 144 | 0 | 144 | 86 | 1.7 | ○ | x |
| 3 | 415 | 170 | 162 | 18 | 144 | 97 | 1.8 | ○ | ○ |
| 4 | 460 | 170 | 171 | 27 | 144 | 103 | 1.9 | ○ | ○ |
| 5 | 485 | 170 | 172 | 28 | 144 | 102 | 1.9 | ○ | ○ |
| 6 | 538 | 170 | 176 | 32 | 144 | 103 | 1.9 | ○ | ○ |
| 7 | 298 | 5 | 144 | 0 | 144 | 86 | 1.7 | x | x |
| 8 | 362 | 5 | 144 | 0 | 144 | 86 | 1.7 | ○ | x |
| 9 | 415 | 5 | 160 | 16 | 144 | 96 | 1.8 | ○ | ○ |
| 10 | 460 | 5 | 169 | 25 | 144 | 101 | 1.9 | ○ | ○ |
| 11 | 485 | 5 | 169 | 25 | 144 | 101 | 1.9 | ○ | ○ |
| 12 | 538 | 5 | 171 | 27 | 144 | 103 | 1.9 | ○ | ○ |
| 13 | Without heating | — | — | — | 144 | 86 | 1.7 | x | x |

The whole bumper reinforcement 11 was then subjected to age hardening at 130° C. for 8 hours. The Vickers hardness and the reaction force in a collision test that simulated motor vehicle crashes were measured as described below. Table 1 shows the results.

Measurement of Vickers Hardness

In the heated portions A2 subjected to reversion treatment (except for No. 13) and a non-heated portion (more specifically, the central portion 12 in this example), the Vickers hardness of a vertical central portion of the front surface (front flange) of the bumper reinforcement 11 was measured at intervals of 10 mm. The average hardness H1 of the heated portions A2 and the average hardness H0 of the non-heated portion were calculated from the measurements. The increase (H1-H0) in hardness of the heated portions A2 was listed in Table 1. The hardness H1 of the heated portions A2 was the average Vickers hardness of the heated portions other than the crushed portions.

Measurement of Reaction Force in Collision

Figure 5:
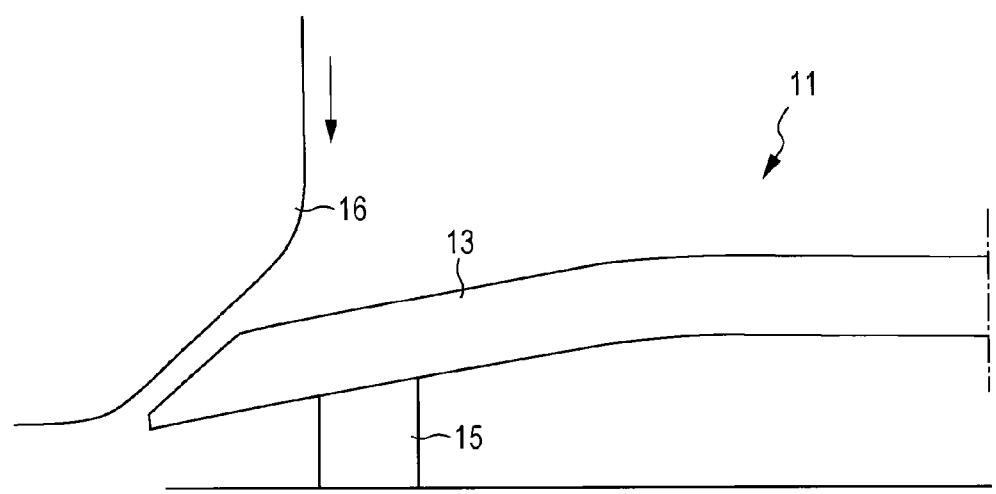
FIG. 5 is a plan view illustrating an end collision test according to an example.

As illustrated in FIG. 5, each of (left and right) joint sections S in the end portions 13 of the bumper reinforcement 11 was supported with a jig 15, which imitated a bumper stay, on the rear flange side. An end collision test that simulated a low-speed collision was performed. The jig 15 had a width of 70 mm, which was the same as the width of the joint section S. In the end collision test, a barrier 16 was disposed so as to collide with the outside of the joint section S of the bumper reinforcement 11. The stroke of the barrier 16 was 40 mm after the barrier 16 collided with the bumper reinforcement 11. The maximum load (which corresponded to the reaction force of the sample (the bumper reinforcement 11)) and energy absorption were determined from the results of the end collision test.

Table 1 shows that in Nos. 3 to 6 and 9 to 12 of Nos. 1 to 13, when the heating temperature of reversion treatment was 400° C. or more, the heated portion had higher Vickers hardness than the non-heated portion by Hv 10 or more, the maximum load (reaction force) was higher than No. 13, which was not heated for reversion treatment, by 10 kN or more, and the energy absorption was also improved. In particular, in Nos. 4 to 6 and 10 to 12, in which the heating temperature was 450° C. or more, the heated portion had higher Vickers hardness than the non-heated portion by Hv 20 or more.

In contrast, Nos. 1, 2, 7, and 8, in which the heating temperature of reversion treatment was less than 400° C., the heated portion did not have Vickers hardness higher than the non-heated portion, and the maximum load (reaction force) was the same as No. 13, which was not heated for reversion treatment. In particular, in Nos. 1 and 7, in which the heating temperature of reversion treatment was low, no effect of reversion treatment was produced, and crushing caused cracking as in No. 13, which was not heated for reversion treatment.

What is claimed is:

1. A bumper reinforcement, formed of a heat-treatable aluminum alloy hollow extrusion, comprising;
   a central portion in an automobile width direction,
   end portions in an automobile width direction; the end portions configured to be subjected to crushing, and
   the whole bumper reinforcement configured to be subjected to age hardening after the crushing,
   wherein
   the end portions are subjected to a reversion treatment before the crushing, and regions in the end portions subjected to the reversion treatment have higher hardness than the central portion which is not subjected to the reversion treatment.

2. A bumper reinforcement, formed of a heat-treatable aluminum alloy hollow extrusion, comprising;
   a central portion in an automobile width direction,
   an end portion in an automobile width direction; the end portion configured to be subjected to crushing, and
   the whole bumper reinforcement configured to be subjected to age hardening after the crushing,
   wherein
   the end portion is subjected to a reversion treatment before the crushing, and a region in the end portion subjected to the reversion treatment has higher hardness than the central portion which is not subjected to the reversion treatment.

3. The bumper reinforcement according to claim 1, wherein
   substantially vertical front and rear flanges and a plurality of substantially horizontal webs coupled to the flanges are disposed on cross sections of the heat-treatable aluminum alloy hollow extrusion, and
   the webs are bent in the crushed portions, so that the distance between the front and rear flanges is decreased.

4. The bumper reinforcement according to claim 2, wherein
   substantially vertical front and rear flanges and a plurality of substantially horizontal webs coupled to the flanges are disposed on cross sections of the heat-treatable aluminum alloy hollow extrusion, and
   the webs are bent in the crushed portion, so that the distance between the front and rear flanges is decreased.

5. The bumper reinforcement according to claim 1, wherein
   the heat-treatable aluminum alloy hollow extrusion is formed of a JIS 7000 series aluminum alloy, and
   a difference in Vickers hardness between the crushed portions and a central portion in a longitudinal direction is higher than or equal to Hv 10.

6. The bumper reinforcement according to claim 2, wherein
   the heat-treatable aluminum alloy hollow extrusion is formed of a JIS 7000 series aluminum alloy, and
   a difference in Vickers hardness between the crushed portion and a central portion in a longitudinal direction is higher than or equal to Hv 10.

7. The bumper reinforcement according to claim 3, wherein
   the heat-treatable aluminum alloy hollow extrusion is formed of a JIS 7000 series aluminum alloy, and
   a difference in Vickers hardness between the crushed portions and a central portion in a longitudinal direction is higher than or equal to Hv 10.

8. The bumper reinforcement according to claim 4, wherein
   the heat-treatable aluminum alloy hollow extrusion is formed of a JIS 7000 series aluminum alloy, and
   a difference in Vickers hardness between the crushed portion and a central portion in a longitudinal direction is higher than or equal to Hv 10.

* * * * *